United States Patent
Kibele et al.

(10) Patent No.: US 11,767,153 B2
(45) Date of Patent: Sep. 26, 2023

(54) MINERAL ENTRAINED PLASTIC FORMULATIONS AS PUNCTURING ELEMENTS

(71) Applicant: CSP TECHNOLOGIES, INC., Auburn, AL (US)

(72) Inventors: Ralf Kibele, Bruckmuehl (DE); Andre Ertzscheid, Niederbronn-les-Bains (FR)

(73) Assignee: CSP Technologies, Inc., Auburn, AL (US)

( * ) Notice: Subject to any disclaimer, the term of this patent is extended or adjusted under 35 U.S.C. 154(b) by 0 days.

(21) Appl. No.: 17/305,866

(22) Filed: Jul. 16, 2021

(65) Prior Publication Data

US 2021/0339937 A1 Nov. 4, 2021

Related U.S. Application Data

(62) Division of application No. 16/609,848, filed as application No. PCT/US2018/030709 on May 2, 2018, now abandoned.

(60) Provisional application No. 62/500,425, filed on May 2, 2017.

(51) Int. Cl.
| | |
|---|---|
| *B65D 81/26* | (2006.01) |
| *B01J 20/28* | (2006.01) |
| *B29C 45/16* | (2006.01) |
| *F26B 21/08* | (2006.01) |

(52) U.S. Cl.
CPC ......... *B65D 81/266* (2013.01); *B65D 81/264* (2013.01); *B01J 20/28042* (2013.01); *B29C 45/16* (2013.01); *B65D 2543/00296* (2013.01); *F26B 21/083* (2013.01)

(58) Field of Classification Search
CPC ........ B65D 2543/00296; B65D 81/264; B65D 81/266; B65D 51/285; B65D 51/2835; F26B 21/083; B29C 45/16; B01J 20/28042

USPC .................................................. 206/219–222
See application file for complete search history.

(56) References Cited

U.S. PATENT DOCUMENTS

| | | | | |
|---|---|---|---|---|
| 3,347,410 A | * | 10/1967 | Schwartzman | .... B65D 81/3222 222/129 |
| 4,103,772 A | | 8/1978 | Wiegner | |
| 5,255,812 A | * | 10/1993 | Hsu | ..................... B65D 51/2835 126/263.01 |
| 5,911,937 A | | 6/1999 | Hekal | |
| 5,941,380 A | | 8/1999 | Rothman | |
| 6,080,350 A | | 6/2000 | Hekal | |

(Continued)

FOREIGN PATENT DOCUMENTS

| | | |
|---|---|---|
| DE | 202016002273 U1 | 6/2016 |
| JP | 201083491 A | 4/2010 |
| JP | 201212030 A | 1/2012 |

OTHER PUBLICATIONS

International Search Report and Written Opinion Issued in PCT/US2018/030709, dated Aug. 21, 2018.

(Continued)

*Primary Examiner* — Chun Hoi Cheung
(74) *Attorney, Agent, or Firm* — Mark T. Vogelbacker; Eckert Seamans Cherin & Mellott, LLC

(57) ABSTRACT

Puncture elements and methods for using the same are disclosed. The puncture elements according to the disclosed concept include a cutting edge or a sharp and are composed of a mineral loaded polymer. The minerals of the mineral loaded polymer include an active agent, such as a desiccant. Optionally, the puncture elements are used to puncture a cover (e.g., foil seal) of a package.

15 Claims, 4 Drawing Sheets

(56) References Cited

U.S. PATENT DOCUMENTS

| | | | |
|---|---|---|---|
| 6,124,006 | A | 9/2000 | Hekal |
| 6,130,263 | A | 10/2000 | Hekal |
| 6,138,821 | A | 10/2000 | Hsu |
| 6,194,079 | B1 | 2/2001 | Hekal et al. |
| 6,247,604 | B1 | 6/2001 | Taskis et al. |
| 6,214,255 | B1 | 10/2001 | Hekal |
| 6,486,231 | B1 | 11/2002 | Hekal |
| 6,543,612 | B2 | 4/2003 | Lee et al. |
| 6,613,405 | B1 | 9/2003 | Hekal |
| 6,926,138 | B1 | 8/2005 | Basham et al. |
| 7,005,459 | B2 | 2/2006 | Hekal |
| 8,701,906 | B1 * | 4/2014 | Anderson ............ B65D 41/20 215/DIG. 8 |
| 2003/0052019 | A1 | 3/2003 | Song |
| 2004/0122175 | A1 | 6/2004 | Hekal |
| 2011/0284402 | A1 | 11/2011 | Sharp |
| 2014/0048430 | A1 | 2/2014 | Giraud |
| 2014/0124394 | A1 | 5/2014 | Guillon et al. |
| 2016/0039955 | A1 | 2/2016 | Klein et al. |

OTHER PUBLICATIONS

Extended European Search Report from EP3619137, dated Nov. 30, 2020.

Igbani et al., "An Investigation on the Free Swelling Volume and Beneficiation Properties of Clay Samples from Wilberforce Island, Bayelsa State, Nigeria.", International Journal of Engineering and Modern Technology ISSN 2504-8856, vol. 3 No. 1 2017, www.iiardpub.org, p. 43-54.

Ho, "Composites of trimethylammonium-modified nanofibrillated cellulose and layered silicates", https://doi.org/10.3929/ethz-a-007608517, published 2012.

Mathiowitz et al., "Novel Desiccants Based on Designed Polymeric Blends", Journal of Applied Polymer Science, vol. 80, 317-327 (2001).

Chen et al., "Polymer/alumina composite desiccant combined with periodic total heat exchangers for air-conditioning systems", International Journal of Refrigeration 67 (2016) 10-21.

Chen et al., "Silica gel/polymer composite desiccant wheel combined with heat pump for air-conditioning systems", Energy 94 (2016) 87-99.

Knox et al., "Investigation of Desiccants and CO2 Sorbents for Advanced Exploration Systems 2015-2016", 46th International Conference on Environmental Systems ICES-2016-48, Jul. 10-14, 2016, Vienna, Austria, pp. 2-13.

"Strong and Flexible Aerogels", (http://www.aerogel.org/?p=1058), posted prior to 2012, accessed Mar. 28, 2023.

* cited by examiner

MINERAL ENTRAINED PLASTIC FORMULATIONS AS PUNCTURING ELEMENTS

CROSS-REFERENCE TO RELATED APPLICATIONS

This application is a divisional application of U.S. application Ser. No. 16/609,848, filed Oct. 31, 2019 which is a U.S. National Phase of International Application No. PCT/US2018/030709, filed May 2, 2018, which claims priority to U.S. Provisional Patent Application No. 62/500,425 filed May 2, 2017, which are incorporated herein by reference in their entireties.

BACKGROUND OF THE INVENTION

1. Field of Invention

This invention relates generally to desiccant entrained plastic formulations. More particularly, the invention relates to use of such formulations as puncturing elements in product packaging, e.g., for puncturing foil, paper, cardboard or plastic membranes or layers.

2. Description of Related Art

There are many items that are preferably stored, shipped and/or utilized in an environment that must be controlled and/or regulated. For example, in the moisture control field, containers and/or packages having the ability to absorb excess moisture trapped therein have been recognized as desirable. The control of moisture, oxygen, ethylene and other gaseous substances may be desirable in medical, electronics and food packaging applications.

Conventionally, desiccants, oxygen absorbers and other active agents have been used in raw form, e.g., as loose particulates housed in sachets or canisters within packaging, to control the internal environment of the package. For many applications, it is not desired to have such loosely stored active substances. To address this problem, the assignee of the present application had developed active entrained polymers comprising active agents, wherein such polymers can be extruded and/or molded into desired forms, e.g., container liners, plugs, film sheets, pellets and other such structures. Optionally, such active entrained polymers may include channeling agents, such as polyethylene glycol (PEG), which form channels between the surface of the entrained polymer and its interior to transmit a selected material (e.g., moisture) to the entrained active agent (e.g., desiccant to absorb the moisture). Entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 2016/0039955, each of which is incorporated herein by reference as if fully set forth.

Entrained polymers may be advantageously molded to form parts of specific geometry. However high loading of desiccant material may make such parts brittle. This is due to the fact that typical desiccant materials are in mineral form, such as silica gel, molecular sieve and bentonite clay. The more desiccant, the more moisture absorption capacity, but also the more brittle the resulting product. Desiccant loading of 60-70% are typical of desiccant entrained polymers that are in the form of pucks, liners and film for product packaging. However, such desiccants generally serve the sole function of desiccating or possibly will provide a defined cavity for product storage (e.g., a desiccant liner in a diagnostic test strip vial). Due to the brittle nature of high mineral desiccant loaded parts, they are not generally adapted to actively and physically engage (e.g., puncture) other components due to risk of breakage.

Where a package volume is small and where manual or automated puncturing of a plastic, paper, foil or cardboard membrane or layer(s) of the package is needed, it would be desired to provide a puncturing member that doubles up as a desiccant element. However, determining the appropriate formulation proportions can be challenging, especially due to the brittleness discussed above.

There thus exists a need for a desiccant entrained polymer that is capable of puncturing a seal, e.g., foil, while also providing a desiccating effect within an enclosed space.

BRIEF SUMMARY OF THE INVENTION

Accordingly, in one aspect, the disclosed concept is directed to a package puncturing element made from a specially formulated desiccant plastic part having appropriate puncturing geometry, e.g., at least one sharp. The sharp should preferably have sufficient modulus to puncture standard packaging foil or plastic laminate upon application of a puncture force.

In an optional embodiment, the entire part is made from a formulation comprising desiccant 30%-50% by weight. The desiccant is optionally molecular sieve. The base polymer is optionally polypropylene or nylon. The channeling agent may be ethylene vinyl acetate (EVA) if used as part of a food contact surface or alternatively polyethylene glycol (PEG) or any other channeling agent disclosed in the patent references cited above. The aforementioned desiccant loading advantageously provides sufficient moisture absorption for the intended application without making the part too brittle to function as a puncture element.

In an optional embodiment, a portion of the part is made as set forth above and is overmolded onto a rigid metal or plastic component that itself comprises a sharp for puncturing. In this way, the desired rigidity (without brittleness) is provided to facilitate puncturing of the foil or plastic package layer(s).

Optionally, a method of puncturing packaging foil or laminate is provided. The method comprises providing a puncturing element according to any embodiment disclosed herein and applying a force between the puncturing element and a packaging layer(s) until the puncturing element breaks through the packaging layer(s).

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

Figure 1:
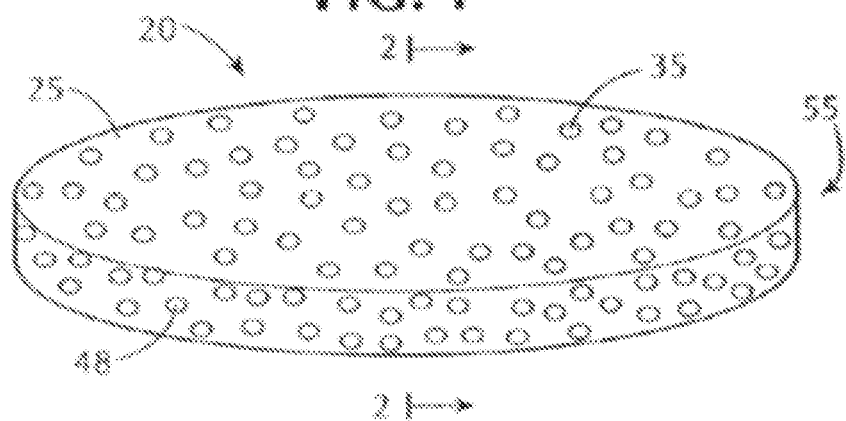
FIG. 1 is a perspective view of a plug formed of an entrained polymer, for purposes of illustrating the construction of an entrained polymer.

As used herein, the term "active" is defined as capable of acting on, interacting with or reacting with a selected material (e.g., moisture or oxygen) according to the invention. Examples of such actions or interactions may include absorption, adsorption or release of the selected material.

As used herein, the term "active agent" is defined as a material that (1) is immiscible with the base polymer and when mixed and heated with the base polymer and the channeling agent, will not melt, i.e., has a melting point that is higher than the melting point for either the base polymer or the channeling agent, and (2) acts on, interacts or reacts with a selected material. The term "active agent" may include but is not limited to materials that absorb, adsorb or release the selected material(s). Active agents according to the invention may be in the form of particles, preferably minerals, but the invention should generally not be viewed as limited only to particulate active agents (unless a respective claim recites otherwise).

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a water absorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylianitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least five times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer.

In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer with an active agent and optionally also a channeling agent entrained or distributed throughout. An entrained polymer thus includes two-phase polymers and three phase polymers. A "mineral loaded polymer" or "mineral loaded entrained polymer" is a type of entrained polymer, wherein the active agent is in the form of minerals, e.g., mineral particles such as molecular sieve or silica gel.

As used herein, the term "monolithic," "monolithic structure" or "monolithic composition" is defined as a composition or material that does not consist of two or more discrete macroscopic layers or portions. Accordingly, a "monolithic composition" does not include a multi-layer composite.

As used herein, the term "phase" is defined as a portion or component of a monolithic structure or composition that is uniformly distributed throughout, to give the structure or composition it's monolithic characteristics.

As used herein, the term "selected material" is defined as a material that is acted upon by, or interacts or reacts with an active agent and is capable of being transmitted through the channels of an entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent. In embodiments in which an adsorbing material is used as an active agent, the selected material may be certain volatile organic compounds and the adsorbing material may be activated carbon.

As used herein, the term "three phase" is defined as a monolithic composition or structure comprising three or more phases. An example of a three phase composition according to the invention would be an entrained polymer formed of a base polymer, active agent, and channeling agent. Optionally, a three phase composition or structure may include an additional phase, e.g., a colorant.

FIGS. 1-4 illustrate exemplary entrained polymers 10, which may be usable according to aspects of the disclosed concept. The entrained polymers 10 each include a base polymer 25, a channeling agent 35 and an active agent 30. As shown, the channeling agent 35 forms interconnecting channels 45 through the entrained polymer 10. At least some of the active agent 30 is contained within these channels 45, such that the channels 45 communicate between the active agent 30 and the exterior of the entrained polymer 10 via channel openings 48 formed at outer surfaces of the entrained polymer 25. The active agent 30 can be, for example, any one of a variety of absorbing, adsorbing or releasing materials, as described in further detail below. While a channeling agent, e.g., 35, is preferred, the invention broadly includes entrained polymers that optionally do not include channeling agents.

Suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent 35 can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Figure 4:
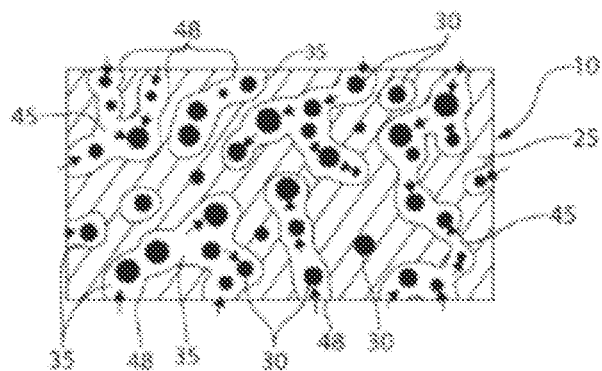
FIG. 4 is a schematic illustration of an entrained polymer according to an optional embodiment, in which the active agent is an absorbing or adsorbing material, e.g., a desiccant.

Suitable active agents according to the invention include absorbing materials, such as desiccating compounds. FIG. 4 illustrates an embodiment of an entrained polymer 10 according to the disclosed concept, in which the active agent 30 is an absorbing or adsorbing material, e.g., a desiccant. The arrows indicate the path of the selected material, for example moisture or gas, from an exterior of the entrained polymer 10, through the channels 45, to the particles of active agent 30, which absorb or adsorb the selected material.

If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds. Optionally, in any embodiment, the desiccant is a mineral.

Optionally, in any embodiment, the active agent may be an oxygen scavenger.

Suitable absorbing materials may also include: (1) metals and alloys such as, but not limited to, nickel, copper, aluminum, silicon, solder, silver, gold; (2) metal-plated particulates such as silver-plated copper, silver-placed nickel, silver-plated glass microspheres; (3) inorganics such as $BaTiO_3$, $SrTiO_3$, $SiO_2$, $Al_2O_3$, ZnO, $TiO_2$, MnO, CuO, $Sb_2O_3$, WC, fused silica, fumed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; (5) elastomers, such as polybutadiene, polysiloxane, and semi-metals, ceramic and; (6) other fillers and pigments.

In another example, the absorbing material may be a carbon dioxide scavenger, such as calcium oxide. In the presence of moisture and carbon dioxide, the calcium oxide is converted to calcium carbonate. Accordingly, calcium oxide may be used as the absorbing material in applications where absorption of carbon dioxide is needed. Such applications include preserving fresh foods (e.g., fruits and vegetables) that give off carbon dioxide.

Other suitable active agents according to the invention include releasing materials. Such materials may comprise any suitable material that will release the selected material from the releasing material. The selected material released from the releasing material could be in the form of a solid, gel, liquid or gas. These substances can perform a variety of functions including: serving as a fragrance, flavor, or perfume source; supplying a biologically active ingredient such as pesticide, pest repellent, antimicrobials, bait, aromatic medicines, etc.; providing humidifying or desiccating substances; delivering air-borne active chemicals, such as corrosion inhibitors; ripening agents and odor-making agents.

Suitable biocides for use as releasing materials in the entrained polymers of the present invention may include, but are not limited to, pesticides, herbicides, nematacides, fungicides, rodenticides and/or mixtures thereof. In addition to the biocides, the covering of the present invention can also release nutrients, plant growth regulators, pheromones, defoliants and/or mixture thereof.

Quaternary ammonium compounds can also be used as releasing materials according to the invention. Such compounds not only function as surfactants, but also impart to the surface of the entrained polymer aseptic properties or establish conditions for reducing the number of microbial organisms, some of which can be pathogenic. Numerous other antimicrobial agents, such as benzalkonium chloride and related types of compounds as hexachlorophene, may also be used as releasing agents according to the invention. Other antimicrobial agents, such as chlorine dioxide releasing agents may be used.

It is believed that the higher the active agent concentration in the mixture, the greater the absorption, adsorption or releasing capacity (as the case may be) will be of the final composition. However, too high an active agent concentration, particularly an active agent in the form of mineral particles, could cause the entrained polymer to be brittle once solidified. In addition, high mineral loading of an entrained polymer can render the molten mixture of active agent, base polymer and channeling agent to more difficult to either thermally form, extrude or injection mold. Applicant has found, therefore, that when brittleness of a mineral loaded entrained polymer is a concern, the percent (by weight) mineral loading of the entrained polymer should preferably be only so much as is absolutely needed to perform its active function, e.g., moisture absorption. In one embodiment, the mineral active agent loading level can range from 20% to 50%, preferably 30% to 50%, by weight with respect to the total weight of the entrained polymer. Optionally, if used, a channeling agent may be provided in a range of 2% to 10% by weight. Optionally, the base polymer may range from 50% to 80% by weight of the total composition. Optionally, a colorant is added, e.g., at about 2% by weight of the total composition.

Referring to FIG. 1, an insert 20 constructed from an entrained polymer that may be used according to an optional aspect of the disclosed concept, is illustrated. The insert 20 is in the form of a plug 55. It should be understood that the plug 55 is only representative of an optional configuration of an entrained polymer part and that the entrained polymer may be formed into different configurations and shapes, such as a puncturing element, as discussed below.

Figure 2:
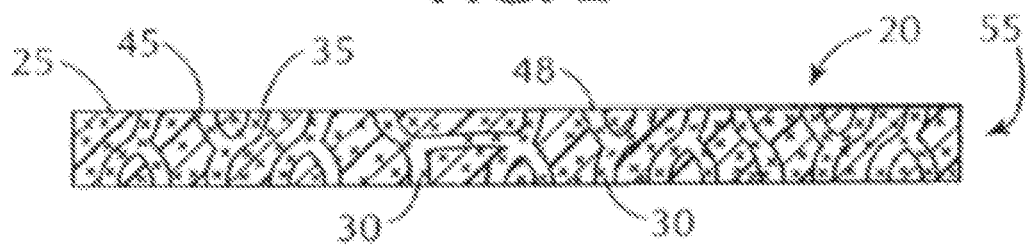
FIG. 2 is a cross section taken along line 2-2 of FIG. 1.

Referring to FIG. 2, a cross-sectional view is shown of the plug 55 that has been constructed from an entrained polymer 10 comprising the base polymer 25 that has been uniformly blended with the active agent 30 and the hydrophilic agent or channeling agent 35. In the illustration of FIG. 2, the entrained polymer has been solidified so that interconnecting channels 45 have formed throughout the entrained polymer 10 to establish passages throughout the solidified plug 55. As may be appreciated from both FIGS. 1 and 2, the passages terminate in channel openings 48 at exterior surfaces of the plug 55.

Figure 3:
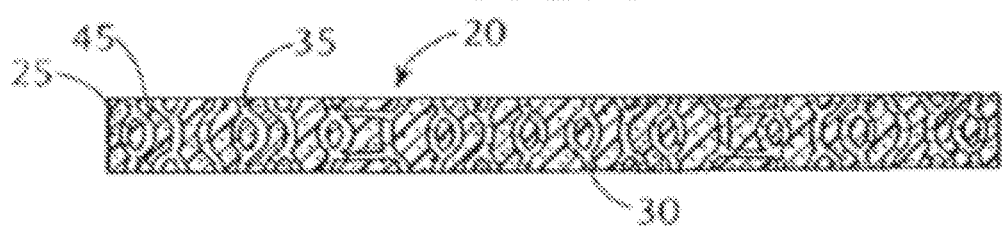
FIG. 3 is a cross section similar to that of FIG. 2, showing a plug formed of another embodiment of an entrained polymer.

FIG. 3 illustrates the embodiment of a plug 55 similar in construction and makeup to the plug 55 of FIG. 2, where interconnecting channels 45 are very fine compared to those of FIG. 2. This can result from the use of a dimer agent (i.e., a plasticizer) together with a channeling agent 35. The dimer agent may enhance the compatibility between the base polymer 25 and the channeling agent 35. This enhanced compatibility is facilitated by a lowered viscosity of the blend, which may promote a more thorough blending of the base polymer 25 and channeling agent 35, which under normal conditions can resist combination into a uniform solution. Upon solidification of the entrained polymer 10 having a dimer agent added thereto, the interconnecting channels 45 which are formed therethrough have a greater dispersion and a smaller porosity, thereby establishing a greater density of interconnecting channels throughout the plug 55.

Interconnecting channels 45, such as those disclosed herein, facilitate transmission of a desired material, such as moisture, gas or odor, through the base polymer 25, which generally resists permeation of these materials, thus acting as a barrier thereto. For this reason, the base polymer 25 itself acts as a barrier substance within which an active agent 30 may be entrained. The interconnecting channels 45 formed of the channeling agent 35 provide pathways for the desired material to move through the entrained polymer 10. Without these interconnecting channels 45, it is believed that relatively small quantities of the desired material would be transmitted through the base polymer 25 to or from the active agent 30. In the case in which the desired material is transmitted to the active agent 30, it may be absorbed by the active agent 30, for example in embodiments in which the active agent 30 is an active agent such as a desiccant or an oxygen absorber. In the case in which the desired material is transmitted from the active agent 30, it may be released from the active agent 30, for example in embodiments in which the active agent 30 is a releasing material, such as a fragrance or gas releasing material.

Figure 5:
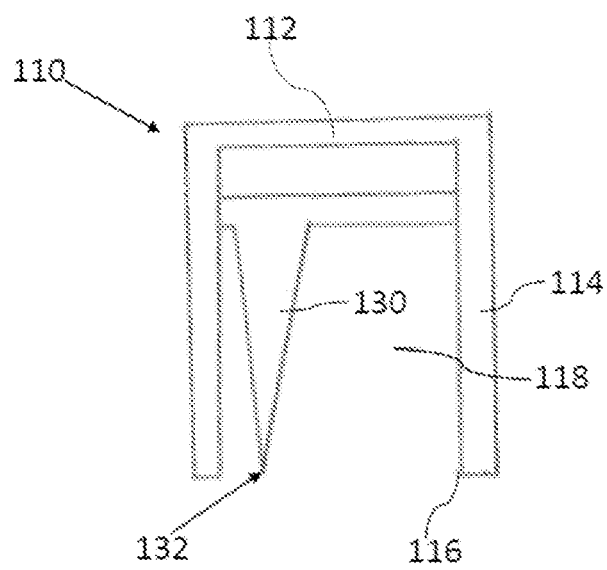
FIG. 5 is a schematic illustration of an optional package according to the disclosed concept, prior to filling of the package with product and without a cover.
Figure 6:
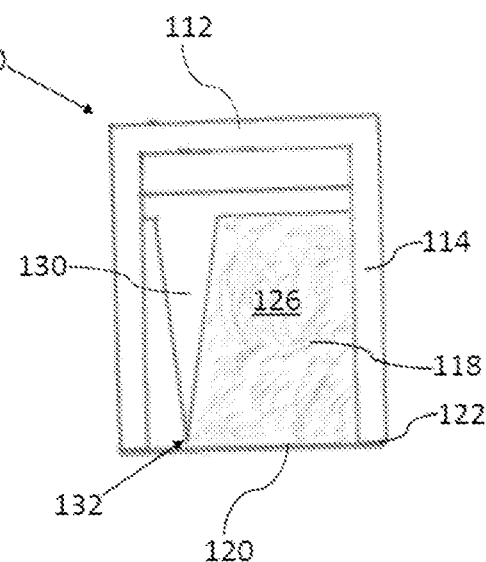
FIG. 6 is a schematic illustration of the package of FIG. 5 filled with product and including a cover over an opening of the package, thereby providing a sealed position.

Referring now to FIGS. 5 and 6, there is shown an optional embodiment of a package 110 according to the disclosed concept. FIG. 5 shows the package 110 prior to being filled with product and sealed. FIG. 6 shows the package 110 in a sealed position.

The package 110 has a base 112 and sidewall 114 extending therefrom, defining an interior 118 of the package 110. The package 110, prior to being sealed, includes an opening 116 leading to the interior 118. As shown in FIG. 6, the package 110, when in the sealed position, includes a cover 120 that encloses a product 126 stored within the interior 118. Optionally, in any embodiment, the product 126 is a powder, for example a powder sensitive to moisture. The cover is optionally secured to a periphery of the opening 116, optionally by a heat seal 122. The heat seal 122 (if used) may be applied by an induction sealing process, as would be familiar to a skilled artisan.

The package 110 further includes a puncture element 130 disposed within the interior 118. The puncture element 130 includes a cutting edge or a sharp 132 facing the cover 120. The cutting edge or sharp 132 is optionally adjacent to the cover 120 or even touches the cover 120 when the package 110 is in the sealed position. The puncture element 130, optionally including the cutting edge or sharp 132 is composed of a mineral loaded polymer comprising a monolithic material formed of at least a base polymer and an active agent comprising minerals, as herein described.

Optionally, in any embodiment, the monolithic material comprises a channeling agent. Optionally, in any embodiment, the active agent in the monolithic material is a desiccant, for example a molecular sieve or a silica gel. Optionally, in any embodiment, the mineral loaded polymer has a mineral loading level of up to 50%, optionally from 20% to 50%, optionally from 30% to 50% by weight of the monolithic material. Optionally, in any embodiment, the active agent is a desiccant that absorbs moisture from the interior 118 of the package 110 to maintain desired qualities of the product 126, such as extending freshness of the product and/or (in the case of a powder) preventing clumping or agglomerating of the product. Optionally, in any embodiment, the cover 120 comprises one or more layers that may include paper, cardboard, plastic, foil or a combination of one or more of the foregoing. Optionally, in any embodiment, the cover is flexible and has a thickness of from 0.01 mm to 1.00 mm, optionally from 0.01 mm to 0.40 mm.

Figure 7:
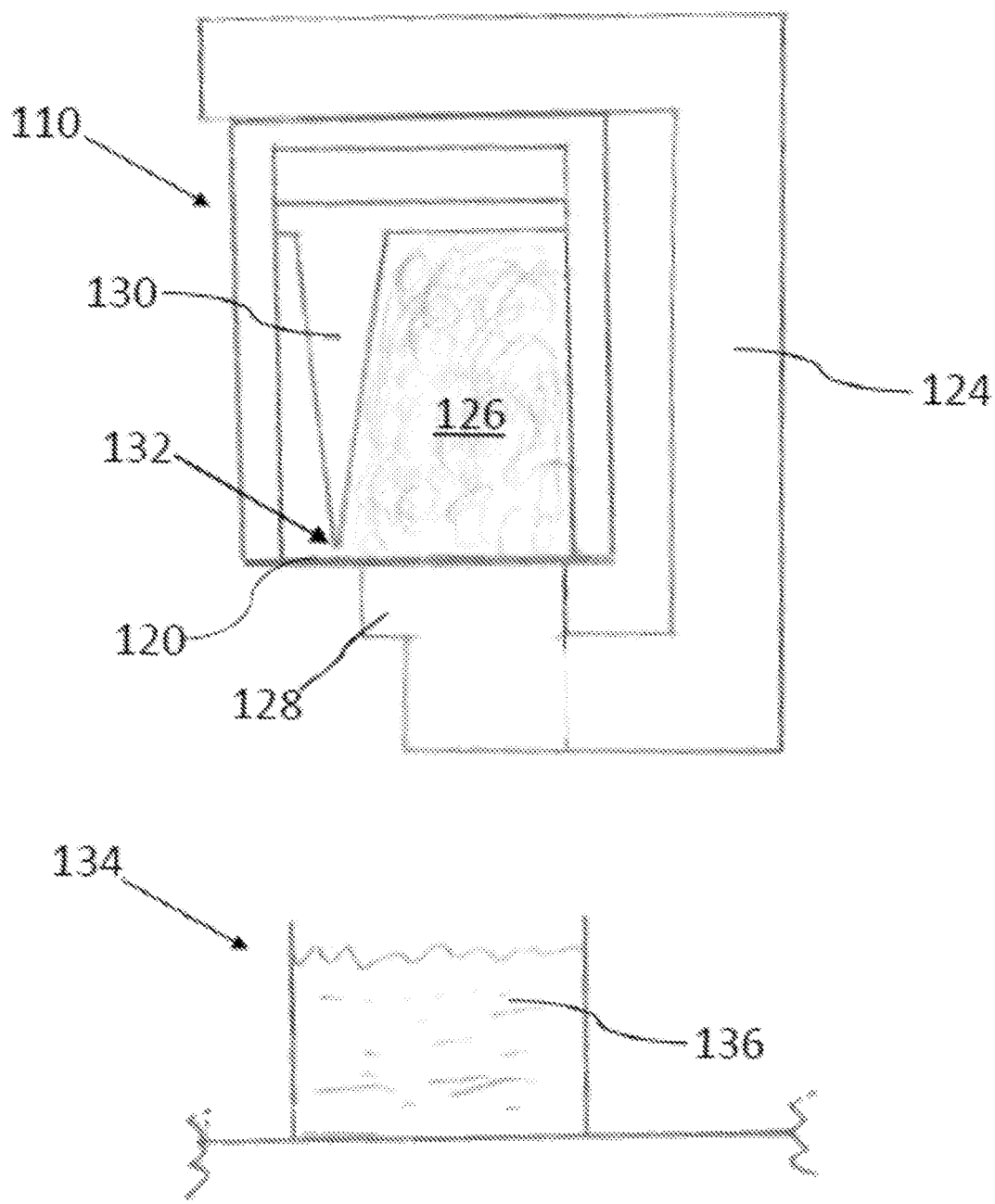
FIG. 7 is a schematic illustration of the filled and sealed package of FIG. 6, disposed within a dispensing apparatus.
Figure 8:
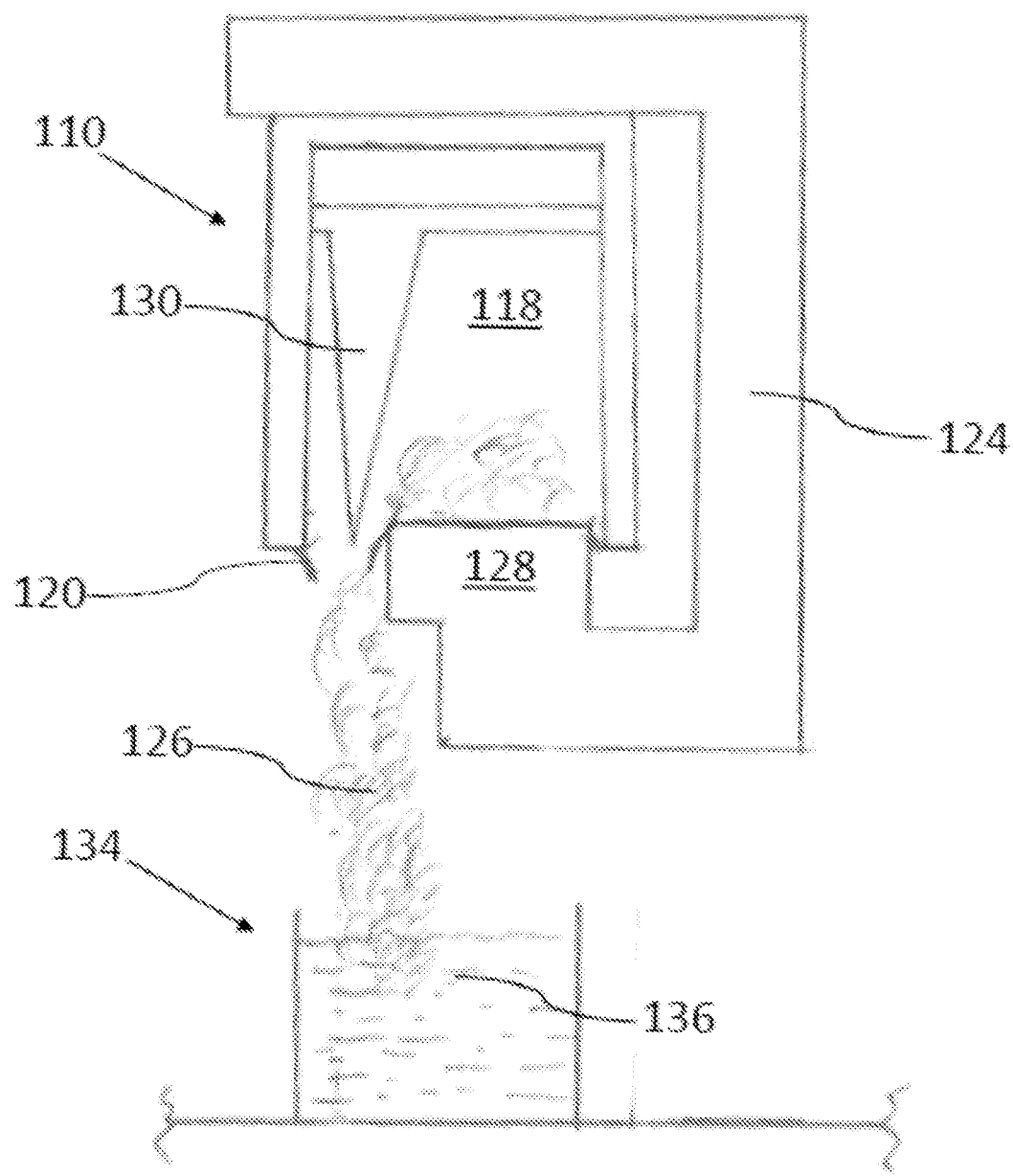
FIG. 8 is a schematic illustration of the package and dispensing apparatus of FIG. 7, showing a dispensing operation of product from the package.

Referring now to FIGS. 7 and 8, there is shown an optional dispensing apparatus 124, which may be used according to methods for dispensing product 126 from the package 110. According to such methods, the package 110 is inserted into the dispensing apparatus 124. The dispensing apparatus 124 may be actuated to transition the package 110 from the sealed position to a dispensing position for dispensing the product 126 from the package 110.

In one optional method, once the package 110 is inserted in the dispensing apparatus 124 and the dispensing apparatus 124 is actuated, pressure is applied onto the cover 120 in a direction normal to the cutting edge or the sharp 132. Optionally, this may be done by a pressure member 128 pressing upward against the cover 120 and/or the package 110 being forced downward such that the pressure member 128 applies a force against the cover 120. In any event, the aforementioned pressure applied onto the cover 120 in a direction normal to the cutting edge or sharp 132 causes the cutting edge or sharp 132 to puncture the cover 120 or detach a portion of the cover 120 from the package 110. This, in turn, transitions the package 110 from the sealed position to a dispensing position in which the product 126 is dispensed through the opening 116.

Optionally, the product 126 is dispensed into a receptacle 134 below the package 110 and filled with a liquid 136. Optionally, the product 126 is mixed with the liquid 136 to form a solution.

Optionally, in any embodiment, the base polymer is a polypropylene, e.g., S-1005 P.

Optionally, in any embodiment, the disclosed concept is broadly directed to a puncture element (e.g., 130) having a cutting edge or a sharp (e.g., 132), wherein the puncture element (optionally, the entire puncture element, preferably including the cutting edge or sharp) is composed of a mineral loaded polymer comprising a monolithic material formed of at least a base polymer and an active agent comprising minerals. The disclosed concept is not limited to use of the puncture element in a package (e.g., 110), although that is currently its preferred application.

Optionally, in any embodiment, the active agent in the puncture element is a desiccant, e.g., molecular sieve or silica gel. Optionally, in any embodiment of the puncture element, the mineral loaded polymer has a mineral loading level of up to 50%, optionally from 20% to 50%, optionally from 30% to 50% by weight of the monolithic material. Optionally, in any embodiment of the puncture element, if the puncture element has a sharp (i.e., a point or the like), the sharp has a diameter or cross sectional width of less than 10 mm, optionally less than 0.75 mm, optionally from 0.01 mm to 0.75 mm, optionally from 0.03 mm to 0.5 mm Optionally, in any embodiment of the puncture element, if the puncture element has a cutting edge (i.e., a blade), the cutting edge has a width of less than 1.0 mm, optionally less than 0.75 mm, optionally from 0.01 mm to 0.75 mm, optionally from 0.03 mm to 0.5 mm Optionally, in any embodiment, the puncture element is configured to puncture, without breaking and upon a sufficient application of pressure, a 40 micron thick aluminum foil cover. Optionally, the disclosed concept is directed to use of any embodiment of a puncture element as disclosed herein to puncture a cover, optionally a cover (e.g., 120) sealing a package (e.g., 110).

While the invention has been described in detail and with reference to specific examples thereof, it will be apparent to one skilled in the art that various changes and modifications can be made therein without departing from the spirit and scope thereof.

What is claimed is:

1. A method for dispensing a product into a liquid to form a solution, the method comprising the steps of:
   a. providing a package having a base and a sidewall extending therefrom defining an interior of the package, the package further having an opening leading to the interior and a cover sealing the opening when the package is in a sealed position to enclose a product stored therein, the package further comprising a puncture element disposed within the interior, the puncture element having a cutting edge or sharp facing the cover, wherein the puncture element, including the cutting edge or sharp, is composed of a desiccant entrained polymer comprising a monolithic material formed of at least a base polymer and a mineral desiccant, the mineral desiccant comprising at least 30% by weight of the monolithic material, the puncture element serving the dual purpose of being i) sufficiently rigid to puncture the cover and ii) configured to absorb or adsorb moisture;
   b. providing a receptacle below the package, the receptacle being filled with a liquid;
   c. applying pressure against the cover with the cutting edge or sharp until the cutting edge or sharp breaks through the cover so as to dispense the product from the package into the liquid; and
   d. combining the product with the liquid to form a solution;
   wherein the puncture element provides at least the following two functions:
   i. controlling moisture within the interior, when the package is in the sealed position so as to maintain desired qualities of the product; and
   ii. puncturing the cover to dispense the product, without the puncture element itself breaking when puncturing the cover.

2. The method of claim 1, wherein the monolithic material further comprises a channeling agent.

3. The method of claim 1, wherein the mineral desiccant is molecular sieve.

4. The method of claim 1, wherein the mineral desiccant is silica gel.

5. The method of claim 1, wherein the mineral desiccant makes up from 30% to 50% by weight of the monolithic material.

6. The method of claim 5, wherein the product is a powder and the puncture element controls moisture within the interior so as to extend freshness of the product and/or prevent clumping or agglomerating of the product.

7. The method of claim 6, the cover being flexible and having a thickness of from 0.01 mm to 1.00 mm, the monolithic material further comprising a channeling agent, the mineral desiccant being molecular sieve or silica gel and the puncture element having a sharp having a diameter or cross-sectional width of less than 1.0 mm.

8. The method of claim 7, wherein the cover comprises one or more foil packaging layers.

9. The method of claim 6, the cover being flexible and having a thickness of from 0.01 mm to 1.00 mm, the monolithic material further comprising a channeling agent, the mineral desiccant being molecular sieve or silica gel and the puncture element having a cutting edge having a width of less than 1.0 mm.

10. The method of claim 9, wherein the cover comprises one or more plastic packaging layers.

11. The method of claim 5, wherein the cover is flexible and has a thickness of from 0.01 mm to 1.00 mm.

12. The method of claim 1, wherein the puncture element has a sharp having a diameter or cross-sectional width of less than 1.0 mm.

13. The method of claim 1, wherein the puncture element has a cutting edge having a width of less than 1.0 mm.

14. The method of claim 1, wherein the base polymer is nylon.

15. The method of claim 1, wherein the mineral desiccant comprises 60-70% by weight of the monolithic material.

* * * * *